United States Patent [19]

Harman et al.

[11] 4,290,303
[45] Sep. 22, 1981

[54] APPARATUS FOR MEASURING SURFACE SCRATCHES ON A TUBE

[75] Inventors: Douglas G. Harman; Ralph E. Lambert, both of Tampa; George W. Gruber, Largo, all of Fla.

[73] Assignee: Westinghouse Electric Corp., Pittsburgh, Pa.

[21] Appl. No.: 54,515

[22] Filed: Jul. 3, 1979

[51] Int. Cl.³ .............................................. G01B 5/28
[52] U.S. Cl. ................................... 73/105; 33/174 P; 33/DIG. 13
[58] Field of Search ................ 73/105; 174/100.41 R; 33/DIG. 13, 174 P, 174 Q

[56] References Cited

U.S. PATENT DOCUMENTS

| | | | |
|---|---|---|---|
| 2,240,536 | 5/1941 | Woven | 73/105 X |
| 2,396,394 | 3/1946 | Shaw | 73/105 |
| 2,460,726 | 2/1949 | Arndt, Jr. | 73/105 |
| 2,495,797 | 1/1950 | Whitlock et al. | 33/178 E |
| 2,841,008 | 7/1958 | Breems et al. | 73/105 |
| 3,368,395 | 2/1968 | Wright | 73/105 |
| 3,714,715 | 2/1978 | Coes, Jr. | 73/105 |
| 3,777,558 | 12/1973 | Bain | 73/105 |
| 3,875,667 | 4/1975 | Wilke | 33/174 Q X |
| 4,106,333 | 8/1978 | Salje | 73/105 |

*Primary Examiner*—Daniel M. Yasich
*Attorney, Agent, or Firm*—F. J. Baehr, Jr.

[57] ABSTRACT

A cantilevered leaf spring with strain gages on the top and bottom surfaces and a phonograph needle disposed on the free end is disposed in a split tubular base which fits over a long tube to measure the depth of scratches in the outer surface of a long tube.

3 Claims, 8 Drawing Figures

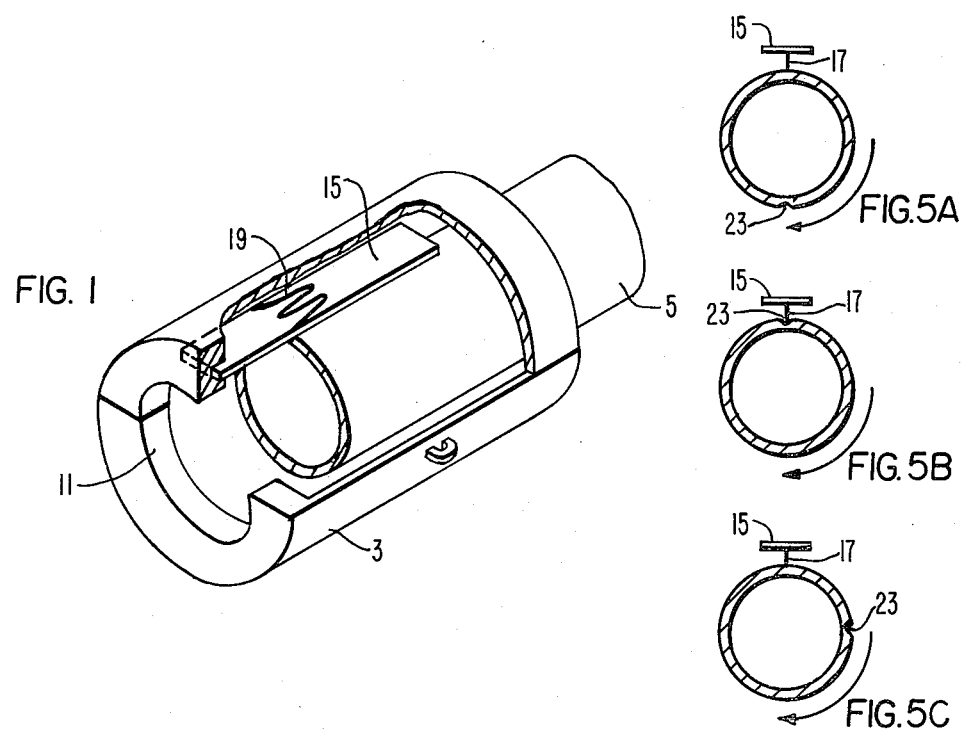
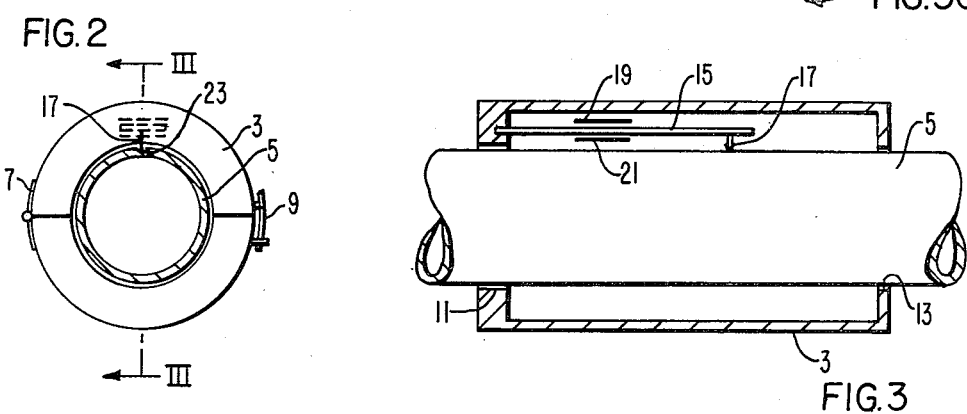
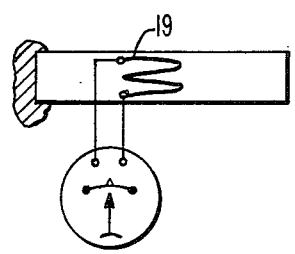
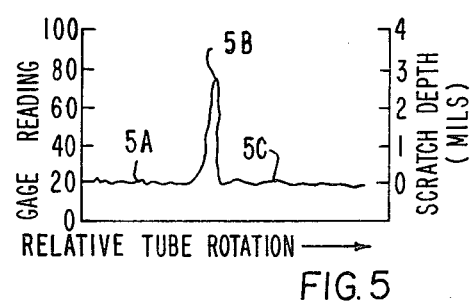

APPARATUS FOR MEASURING SURFACE SCRATCHES ON A TUBE

BACKGROUND OF THE INVENTION

This invention relates to an apparatus for measuring surface defects and more particularly for measuring the depth of surface scratches on the outside of a tube.

Many methods and apparatus have been utilized to follow the profile of a surface and determine the depth of scratches and other defects; however, such apparatus employ mechanical linkage or changes in induction of coils making the apparatus relatively large so that it would be difficult to utilize such apparatus to check the depth of scratches on tubes closely packed in a tube bundle. Another problem that must be solved is the apparatus must fit over a segment of a tube disposed between two support sheets. As the tubes are often scratched while being inserted in the tube bundle and if the tube bundle is a portion of a nuclear steam generator, measuring the depth of the scratches is important for if the scratches are very deep the tubes should be replaced.

SUMMARY OF THE INVENTION

Apparatus for measuring a surface defect, when made in accordance with this invention, comprises a support shaped to conform with the surface, a cantilevered member connected to the support and biased toward the surface, a needle fastened on the distal end of the cantilevered member, and a strain gage affixed to the cantilevered member so that the needle traverses the surface it follows, the surface and defects therein cause the cantilevered member and strain gage to flex and produce a signal which can be calibrated to indicate the depth of a defect relative to the surface.

BRIEF DESCRIPTION OF THE DRAWINGS

The objects and advantages of this invention will become more apparent by reading the following detailed description in connection with the accompanying drawings, in which:

FIG. 1 is a perspective view partially in section of apparatus which is made in accordance with this invention for measuring surface defects;

FIG. 2 is an elevational view of the apparatus;

FIG. 3 is a sectional view taken on line III—III of FIG. 2;

FIG. 4 is a schematic view of the apparatus connected to a galvanometer; and

FIGS. 5, 5A, 5B, and 5C show a plot of a surface profile of a tube with a longitudinal scratch on the tube.

DESCRIPTION OF THE PREFERRED EMBODIMENT

Referring now to the drawings in detail and in particular to FIGS. 1 through 4 there is shown apparatus 1 for measuring surface defects such as scratches on the outside surface of a tube. While the apparatus described hereinafter is particularly adapted to be utilized on the outer surface of a tube, it is understood that the support structure can be modified so that the apparatus could be utilized on a planar surface or on a concaved-curve surface as well as on a convexed-curve surface.

The apparatus 1 comprises a support 3 shaped to conform to and slide over the surface being tested, in the preferred embodiment, the outer side of a tube 5. The support 3 is a tubular member which is split axially so that it can be fitted over the tube 5 extending between tube support sheets (not shown). The support 3 has hinges 7 and a latch 9 or other means for allowing the support to be fitted over the tube 5. The support 3 also has bearing surfaces 11 and 13, or other means, which contact the tube 5 and allow at least free rotational movement between the support 3 and tube 5.

Cantilevered from the support 3 is a leaf spring or cantilevered member 15 which is disposed within the support 3 and has one end rigidly connected to the support 3. A phonograph needle or other means 17 is affixed to the distal end or free end of the cantilevered member 15, is biased inwardly toward the tube 5 and is so disposed that the needle 17 is biased against the outer surface of the tube 5.

Affixed to the cantilevered member 15 are strain gages 19 and 21 disposed on opposite sides of the cantilevered member 15. In the preferred embodiment, two strain gages 19 and 21 are electrically connected together so the signals add to improve the sensitivity. The strain gages 19 and 21, respectively mount on the top and bottom surface of the cantilevered member 15 and measure elastic strain which is proportional to the deflection of the distal or free end of the cantilevered member 15. The phonograph needle 17 is cemented to the free end of the cantilevered member 15 and follows the surface contour as it traverses the surface. As shown in FIGS. 5, 5A, 5B, and 5C the amplitude of the strain gage signal is proportional to the depth of surface irregularity such as scratches 23 which produce a high amplitude signal as indicated at 5B, other portions of the surface are relatively smooth as indicated at 5A and 5C. The apparatus hereinbefore described is compact and dependable so that it can be utilized inside a steam generator as it is being manufactured.

What is claimed is:

1. Apparatus for measuring a surface defect, on a tube said apparatus comprising;
    a support tubularly shaped to conform to said tubular surface and being split axially to fit over said tube;
    a cantilevered member having one end thereof rigidly connected to said support and a distal end biased toward said surface;
    a needle fastened on said distal end of said cantilevered member;
    a first strain gage affixed to one side of said cantilevered member,
    a second strain gage affixed to a side opposite the one side of said cantilevered member, and
    said strain gages being electrically connected together to produce an improved signal, whereby as said apparatus is traversed over said surface said needle follows said surface and defects thereon to cause said cantilevered member and said strain gages to flex and produce the improved signal, which can be calibrated to indicate the depth of the defect relative to the surface.

2. Apparatus as set forth in claim 1, wherein the support has a surface on opposite ends thereof which conform to the outer surface of the tube.

3. Apparatus as set forth in claim 1, wherein the cantilevered member is a flexible leaf spring-like member.

* * * * *